(12) United States Patent
Lui

(10) Patent No.: US 9,572,448 B2
(45) Date of Patent: Feb. 21, 2017

(54) DUAL POT

(71) Applicant: Yiu Kong Lui, Arcadia, CA (US)

(72) Inventor: Yiu Kong Lui, Arcadia, CA (US)

( * ) Notice: Subject to any disclaimer, the term of this patent is extended or adjusted under 35 U.S.C. 154(b) by 0 days.

(21) Appl. No.: 13/998,069

(22) Filed: Sep. 26, 2013

(65) Prior Publication Data

US 2015/0083730 A1   Mar. 26, 2015

(51) Int. Cl.
*A47J 27/10* (2006.01)
*A47J 27/00* (2006.01)
*A47J 36/00* (2006.01)

(52) U.S. Cl.
CPC ................... *A47J 27/002* (2013.01)

(58) Field of Classification Search
CPC ............ A47J 27/10; A47J 27/12; A47J 27/18; A47J 27/16; A47J 27/122; A47J 27/002
USPC ........................... 220/573.1, 573.4, 506, 555
See application file for complete search history.

(56) References Cited

U.S. PATENT DOCUMENTS

| | | | |
|---|---|---|---|
| 1,383,853 A * | 7/1921 | Preston | 206/546 |
| 1,577,781 A * | 3/1926 | Adams | 126/385.1 |
| 2,028,671 A * | 1/1936 | Kollman | 220/506 |
| 3,946,893 A * | 3/1976 | Bowersmith | 220/573.4 |
| 4,395,015 A * | 7/1983 | Reardon | 249/115 |
| D296,647 S * | 7/1988 | Carman | D7/357 |
| 5,012,947 A * | 5/1991 | Roland | 220/573.1 |
| 5,293,021 A * | 3/1994 | Davis | 219/728 |
| 5,441,169 A * | 8/1995 | Petty | 220/573.4 |
| 5,644,976 A * | 7/1997 | Muchin et al. | 99/422 |
| 5,924,591 A * | 7/1999 | Contos | 220/573.1 |
| 6,467,645 B2 * | 10/2002 | Park | 220/592.28 |
| D486,991 S * | 2/2004 | Lee | D7/357 |
| 7,378,623 B2 * | 5/2008 | Tarenga | 219/621 |
| 8,561,792 B2 * | 10/2013 | Young | 206/222 |
| 2001/0032856 A1 * | 10/2001 | Casey | 220/573.1 |
| 2005/0045046 A1 * | 3/2005 | Cheng | 99/422 |
| 2011/0017750 A1 * | 1/2011 | Fortkamp | 220/573.1 |

* cited by examiner

*Primary Examiner* — J. Gregory Pickett
*Assistant Examiner* — Niki M Eloshway
(74) *Attorney, Agent, or Firm* — Raymond Y. Chan; David and Raymond Patent Firm

(57) ABSTRACT

A cooking pot includes a pot body having a bottom wall and a peripheral wall and defining a cooking cavity within the peripheral wall; and a fluid reservoir including a surrounding wall provided at a mid-portion of the pot body and defining a fluid cavity for receiving a predetermined amount of liquid therein. During dry cooking process, the peripheral wall of the pot body is directly heat-conducted for dry cooking the food within the cooking cavity while the surrounding wall of the fluid reservoir is heat-conducted through the liquid for dry cooking the food within the cooking cavity.

12 Claims, 3 Drawing Sheets

DUAL POT

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a cooking pot, and more particularly to a cooking pot for dry-cooking, wherein the heat from the heat source is transferred for dry-cooking the food though the thermal conduction of the cooking pot and the thermal convection.

Description of Related Arts

Cooking pots are one type of cookware commonly found in a kitchen. The cooking pot is made of heat conductive material to transfer heat from a bottom surface to an interior cooking surface when the bottom surface of the cooking pot is placed on top of a heat source, such as a gas heater and an electric heater. For minimizing the heat loss of the cooking pot, the size of the bottom surface of the conventional cooking pot should be larger than the size of the heat generating surface from the heat source. In other words, the bottom surface of the conventional cooking pot should cover the heat generating surface from the heat source. Generally speaking, a mid-portion of the bottom surface of the conventional cooking pot will be heated first by the heat source, and the heat from the mid-portion of the bottom surface will be radially dissipated to the peripheral-portion of the bottom surface. In other words, the temperature at the center portion of the conventional cooking pot will be extremely higher than the temperature at the peripheral portion during cooking.

One of the common cooking methods is a food boiling method by using the cooking pot is to fill a predetermined amount of fluid, such as soup or water, as a heat transferring medium in the cooking pot. For example, the cooking pot is filled with water for boiling the liquid therein. In such a manner, the heat generated by the heat source can be conducted through the bottom surface of the cooking pot to the water so as to cook the foods in the water. It is worth mentioning that since the heat from the heat source will boil the water first, the heat can be evenly dissipated through the water in the cooking pot.

Another cooking method is dry cooking. In the dry cooking method, the food is cooked with a relatively less amount of water. Sometimes, the food is cooked in a waterless manner in such dry cooking method. The main concept of this dry cooking method is to directly transfer the heat from the heat source to the food through the conductive material of the cooking pot. In other words, the food will be cooked through the direct contact of the cooking surface of the cooking pot. In other words, the food is cooked by the heat conductive ability of cooking pot while the heat conductive ability will be dramatically affected by the structure of the cooking pot.

However, in the dry cooking process, the conventional cooking pot has several drawbacks. A major drawback of the conventional cooking pot is that the cooking pot provides an unevenly heating conductive ability. In other words, the food cooking within the conventional cooking pot is easy to be over-burnt after the less amount of water is evaporated. Owing to that the cooking surface of the conventional cooking pot is larger than the heat generating surface from the heat source, the temperature of the mid-portion of the bottom surface of the cooking pot is higher than the temperature of the peripheral portion thereof. Therefore, the foods placed at the mid-portion of the bottom surface of the cooking pot are rapidly cooked. But, at the same time, the foods placed at the peripheral portion of the bottom surface of the cooking pot will not be cooked yet. In other words, the foods placed at the center of the cooking pot are easily scorched.

Furthermore, each conventional cooking pot can only provide one single cooking method. When the user uses one cooking pot for cooking the food by boiling method, the same cooking pot cannot be used for cooking different foods via another cooking method such as dry cooking method. It will be time-consuming when the users want to cook different foods via different cooking methods at the same time by using the same cooking pot. It will be a waste of gas to cook different foods by using different cooking pots.

SUMMARY OF THE PRESENT INVENTION

The main object of the present invention is to provide a cooking pot for dry-cooking food, wherein the heat from the heat source is transferred for dry-cooking the food though the thermal conduction of the pot and the thermal convection through the liquid.

Another object of the present invention is to provide a cooking pot, which comprises a pot body having a peripheral wall being thermally dissipated the heat to the cooking cavity though the thermal conduction of the pot.

Another object of the present invention is to provide a cooking pot, which comprises a fluid reservoir at a mid-portion of the pot body to thermally dissipate the heat to the cooking cavity though the thermal convection of the pot, so as to provide an evenly heating ability of the cooking pot during a dry-cooking process.

Another object of the present invention is to provide a cooking pot, which comprises a surrounding wall of the fluid reservoir being heat conducted through liquid, a peripheral-portion surface, and a peripheral wall being directly heat conducted for dry-cooking the food.

Another object of the present invention is to provide a cooking pot for dry-cooking food, wherein the fluid reservoir for being filled with the water so as to boil the water, and then the water in the fluid reservoir can evenly dissipate the heat from the heat source to the surrounding wall of the fluid reservoir so as to prevent the high temperature region of the bottom wall of the pot body.

Another object of the present invention is to provide a cooking pot for dry-cooking food, wherein the surrounding wall of the fluid reservoir is heat-conducted through the liquid for dry-cooking the food within the cooking cavity.

Another object of the present invention is to provide a cooking pot for dry-cooking food, wherein the dry-cooking method and the boiling cooking method can be used in the same cooking pot to cook different foods at the same time.

Another object of the present is to provide a cooking pot for dry-cooking the food, wherein the peripheral wall is integrally extended from the bottom wall of the pot body and is designed as an arc-shape to increase the contacting surface to the food.

Another object of the present invention is to provide a cooking pot, wherein the height of the surrounding wall of the fluid reservoir is higher than the height of the peripheral wall of the pot body in order to prevent the water being spilled out from the fluid reservoir while the fluid reservoir is filled with water during the heating process. In other words, the depth of the fluid cavity is larger than the depth of the cooking cavity.

Another object of the present invention is to provide a cooking pot for dry-cooking food, which comprises a pot opening edge integrally extending from the peripheral wall of the pot body to form a protruded shape so as to facilitate a user for holding the cooking pot.

Another object of the present invention is to provide a cooking pot for dry-cooking, which does not require to alter the original structure design of the cooking pot, so as to minimize the manufacturing cost of the cooking pot incorporating with the fluid reservoir for dry-cooking.

Additional advantages and features of the invention will become apparent from the description which follows, and may be realized by means of the instrumentalities and combinations particular point out in the appended claims.

According to the present invention, the foregoing and other objects and advantages are attained by a cooking pot for dry-cooking food, comprising:

a pot body comprising a bottom wall and a peripheral wall and defining a cooking cavity within the peripheral wall; and a fluid reservoir comprising a surrounding wall provided at a mid-portion of the pot body and defining a liquid cavity for receiving a predetermined amount of liquid therein, during dry cooking process, the peripheral wall of the pot body is directly heat-conducted for dry cooking the food within the cooking cavity while the surrounding wall of the fluid reservoir is heat-conducted through the liquid for dry cooking the food within the cooking cavity.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
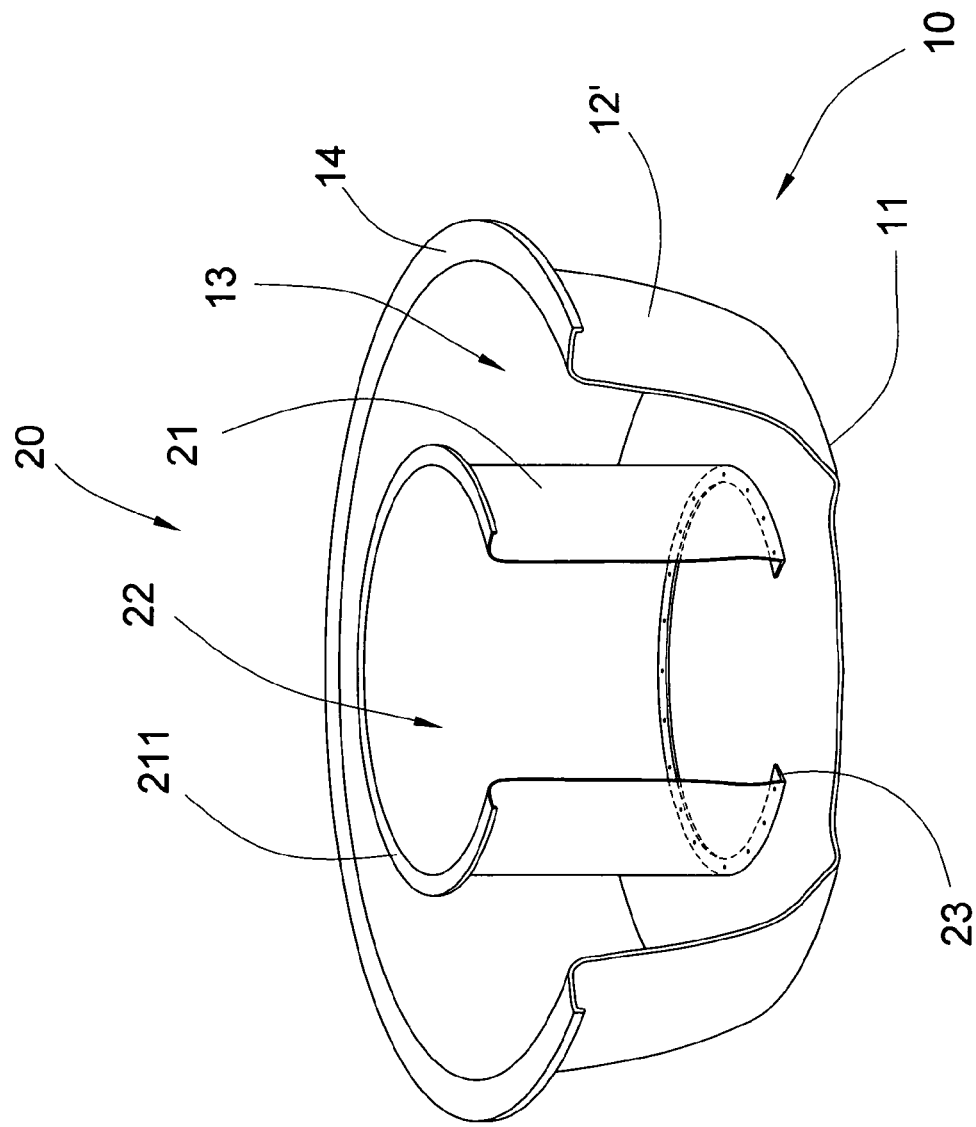
FIG. 1 is a perspective view of a cooking pot for dry-cooking according to a preferred embodiment of the present invention.
Figure 2:
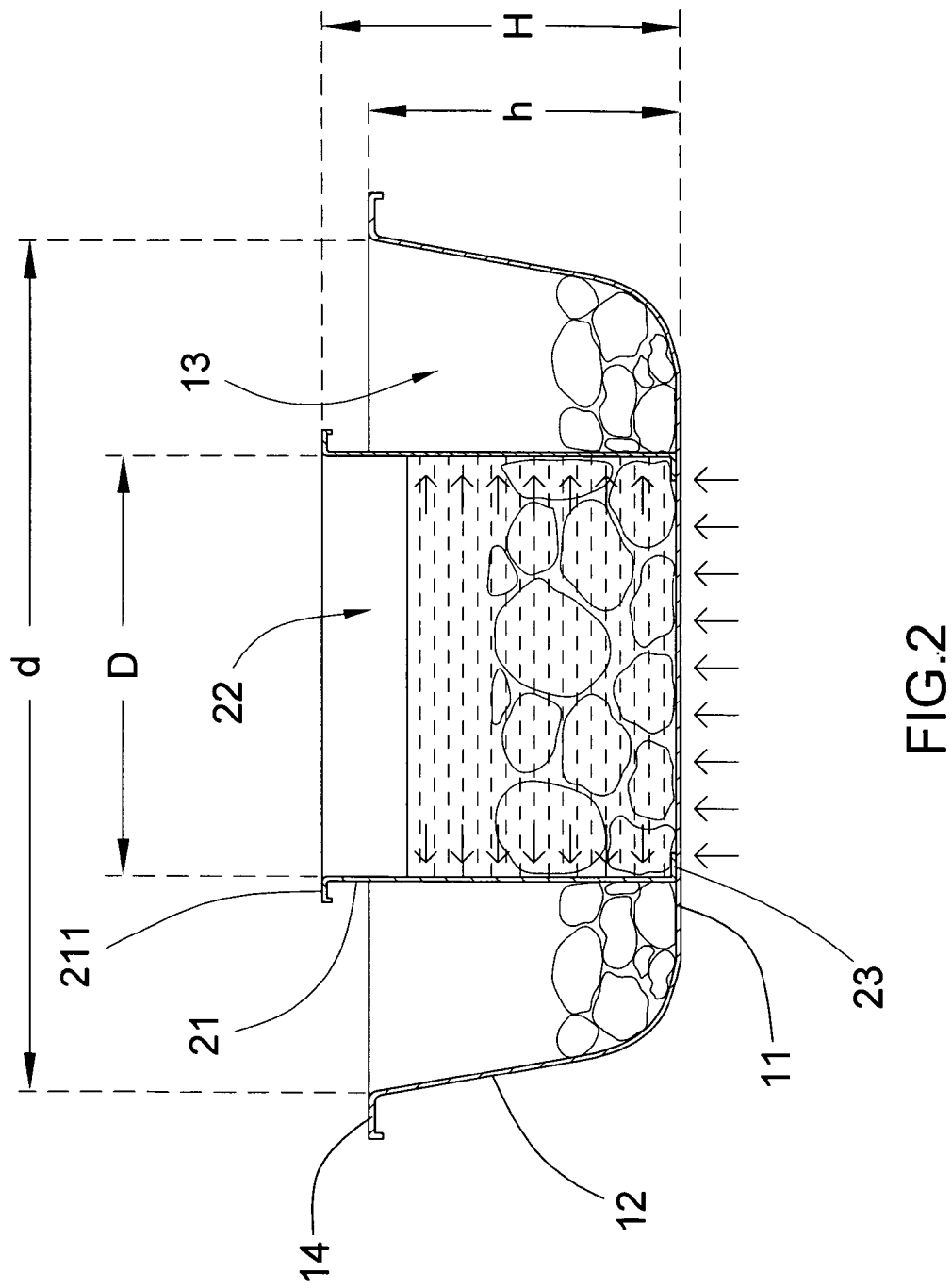
FIG. 2 is a sectional view of the cooking pot for dry-cooking according to a first embodiment of the present invention.

Referring to FIG. 1 to FIG. 2 of the drawings, a cooking pot according to a preferred embodiment of the present invention is illustrated, wherein the cooking pot comprises a pot body 10 and a fluid reservoir 20. Accordingly, the pot body and the fluid reservoir 20 are also embodied as an outer port body and an inner pot body to form a dual pot.

The pot body 10 comprises a bottom wall 11 and a peripheral wall 12 integrally extended from the bottom wall 11 to define a cooking cavity 13 within the peripheral wall 12. The bottom wall 11 of the pot body 10 is a flat surface to be supported on a heat generating surface of a heat source. Accordingly, a surface area of the bottom wall 11 of the pot body 10 should be larger than a surface area of the heat generating surface of the heat source, such that the bottom wall 11 of the pot body 10 should cover the heat generating surface of the heat source. The peripheral wall 12 of the pot body 10 is preferably designed as an arc-shape so that the width of the cooking cavity is upwardly gradually increasing. In other words, the peripheral wall 12 of the pot body 10 is an inclined wall upwardly and outwardly extended from the bottom wall 11 of the pot body 10 such that a diameter size of the cooking cavity 13 is gradually increased from the bottom wall 11 of the pot body 10 so as to enlarge an opening area of the cooking cavity 13.

The pot body 10 further has a high temperature zone and a low temperature zone. According to the preferred embodiment, when the bottom wall 11 of the pot body 10 is a supported on the heat generating surface of the heat source, the high temperature zone is defined at a center portion of the bottom wall 11 of the pot body 10 while the low temperature zone is defined at a peripheral portion of the bottom wall 11 of the pot body 10.

The pot body 10 is made of high thermal conductive material to cook the food within the cooking cavity 13 by means of heat conduction. When the food is disposed in the cooking cavity 13, the peripheral wall 12 and the peripheral portion of the bottom wall 11 of the pot body 10 are arranged for contacting the food. Therefore, the arc-shape peripheral wall 12 can increase the cooking surface for the food. The arc-shape peripheral wall 12 can also support the heat flow from the heat source, such that the heat from the bottom wall 11 can be evenly be conducted to the peripheral wall 12.

The fluid reservoir 20 is provided within the pot body 10 at the high temperature zone. Therefore, the pot body 10 and the fluid reservoir 20 are the outer and inner pot bodies to form a dual pot structure.

The fluid reservoir 20 comprises a surrounding wall 21 upwardly extended from the center portion of the pot body 10 wherein a fluid cavity 22 is formed within the surrounding wall 21 for receiving a predetermined amount of liquid therein. Accordingly, the cooking cavity 13 and the fluid cavity 22 are two individual cavities that they are not communicate with each other such that the liquid within the fluid cavity 22 will not leak into the cooking cavity 13 while the food within the cooking cavity 13 will not enter into the fluid cavity 22.

Therefore, during dry cooking process, the peripheral wall 12 of the pot body 10 is directly heat-conducted while the surrounding wall 21 of the fluid reservoir 20 is heat-conducted through the liquid for dry cooking the food within the cooking cavity. As a result, the peripheral portion of the bottom wall 11, the peripheral wall 12, and the surrounding wall 21 forms a triple-heating wall structure for cooking the food within the cooking cavity 13.

In other words, the low temperature zone directly transfers the heat to the cooking cavity 13 via thermal conduction while the high temperature zone indirectly transfers the heat to the cooking cavity 13 via thermal convection of the liquid.

As shown in FIG. 1, the fluid reservoir 20 is preferably formed in cylinder shape and the material of the fluid reservoir 20 is preferably made of the same material of the pot body 10. Moreover, the thickness of the surrounding wall 21 is the same as the thickness of the bottom wall 11 and the peripheral wall 12 of the pot body 10. In other words, the heat conductive abilities of the fluid reservoir 20 and the pot body 10 are the same. It is worth mentioning that the shape of the fluid reservoir 20 can be altered such as a rectangular, oval, or square, wherein the cylinder fluid reservoir 20 is embodied as a fluid reservoir as an example.

As shown in FIG. 2, the bottom edge of the surrounding wall 21 of the fluid reservoir 20 is sealed at the bottom wall 11 of the pot body 10 to divide an interior of the pot body 10 into the cooking cavity 13 and the fluid cavity 22. In particular, the surrounding wall 21 of the fluid reservoir 20 is coaxially coupled at the center portion of the bottom wall 11 of the pot body 10 that the fluid cavity 22 is surrounded by the cooking cavity 13.

According to the preferred embodiment of the present invention, the diameter of the fluid reservoir 20 is defined as "D", and the diameter of the pot body 10 is defined as "d". In other words, the diameter D of the fluid reservoir 20 is smaller than the diameter d of the pot body 10. The diameter d of the pot body 10 is the diameter of the peripheral wall 12 of the pot body 10 at the top opening of the cooking cavity 13. Preferably, the ratio of D:d is 2:1. It is worth mentioning that the surrounding wall 21 of the fluid reservoir 20 has a cylindrical shape such that the fluid cavity 13 has a uniform diameter d. Therefore, the diameter D of the fluid reservoir 20 is half of the diameter d of the pot body 10. If the diameter D of the fluid reservoir 20 is larger than half of the diameter d of the pot body 10, the cooking cavity 13 of the pot body 10 will be reduced for containing the food. Otherwise, if the diameter D of the fluid reservoir 20 is smaller than half of the diameter d of the pot body 10, the center portion of the bottom wall 11 may not be big enough to cover the high temperature zone of the pot body 10.

In addition, the height of the surrounding wall 21 of the fluid reservoir 20 is defined as a value of "H", and the height of the peripheral wall 12 of the pot body 10 is defined as a value of "h". The height H of the surrounding wall 21 of the fluid reservoir 20 is the depth of the fluid cavity 22. The height h of the pot body 10 is the depth of the cooking cavity 13. Preferably, the height H of the surrounding wall 21 of the fluid reservoir 20 is larger than the height h of the pot body 10. In other words, the depth of the fluid cavity 22 is larger than the depth of the cooking cavity. Therefore, when the fluid reservoir 20 is filled with water during the heating process, the water in the fluid cavity 22 will not spill out to the cooking cavity 13.

In particular, the bottom of the fluid reservoir 20 is sealedly welded on the bottom wall 11 of the pot body 10, such that the fluid cavity 22 of the fluid reservoir 20 and the cooking cavity 13 of the pot body 10 are two individual cavities. Accordingly, the fluid cavity 22 of the fluid reservoir 20 can be filled with a predetermined amount of water for cooking the food, and the cooking cavity 13 of the pot body 10 can be filled with relatively less amount of water or even no water for dry-cooking the food, so as to provide two different types of cooking methods at the same time via the dual pot structure.

As shown in FIG. 2, the fluid reservoir 20 further comprises a welding wall 23 which is integrally and inwardly extended from the bottom edge of the surrounding wall 21 within the fluid cavity 22 and is permanently coupled at the bottom wall 11 of the pot body 10.

In other words, the bottom welding edge of the fluid reservoir 20 at the welding wall 23 is inwardly welded on the bottom wall 11 of the pot body 10 such that the welding edge contacts with the liquid within the fluid cavity 22. During the dry-cooking process, the heat source is provided at the center portion of the bottom wall 11 as the high temperature zone of the pot body 10, the welding edge can evenly dissipate the heat from the heat source to the liquid in the fluid cavity 22 through the thermal convection of the liquid therein. Therefore, the welding edge will not be directly heated by the conduction of the bottom wall 11 of the pot body 10 only. Due to the high temperature zone, the welding structure of the welding edge of the fluid reservoir 20 will be affected through on the thermal conduction of the pot body 10. In other words, when the welding edge of the fluid reservoir 20 is located within the fluid cavity 22, the heat at the welding edge of the fluid reservoir 20 can effectively transfer to the fluid therein to prevent the welding edge of the fluid reservoir 20 from being overheated.

According to the first preferred embodiment, the heat source is mainly provided at the center portion of the bottom wall 11 of the pot body 10 to define the high temperature zone thereat, so that the heat from the heat source is transferred to the liquid in the fluid cavity 22 through a thermal conduction of the bottom wall 11 of the pot body 10. Then, the heat from the liquid is transferred to the surrounding wall 21 of the fluid reservoir 20 through a thermal convection of the liquid for dissipating the heat so as to effectively transfer the heat at the high temperature zone of the center portion of the bottom wall 11 to the cooking cavity 13. It is worth mentioning that the heat from the high temperature zone will be evenly dissipated to the surrounding wall 21 through the liquid convection. In other words, the temperature at the surrounding wall 21 will be even at any area thereof.

Moreover, the heat from the heat source can be dissipated from the center portion of the bottom wall 11 to the peripheral portion of the bottom wall 11 and the peripheral wall 12 of the pot body 10 through the thermal conduction of the cooking pot. It is worth mentioning that the cooking temperature at the cooking cavity 13 can be controlled in response to the low temperature zone and the food within the cooking cavity 13 will not be overcooked due to the high temperature zone.

As shown in FIG. 2, the surrounding wall 21 has a top blocking rim 211 protruded integrally, outwardly and radially. Accordingly, the top opening of the fluid cavity 22 is defined with the top blocking rim 211. In other words, the top blocking rim 211 is located above the top opening of the cooking cavity 13. In addition, the top blocking rim 211 is outwardly protruded within the cooking cavity 13. Therefore, when the fluid cavity is filled with water as an example, the top blocking rim 211 will block the food within the cooking cavity 13 to enter into the fluid cavity 22 especially when the food is stirred within the cooking cavity 13.

In addition, the pot body 10 further comprises a handle edge 14 integrally and outwardly extended from the top edge of the peripheral wall 12 such that the cooking pot can be carried on via the handle edge 14.

Accordingly, during the dry-cooking process, the food is disposed within the cooking cavity 13 of the pot body 10. The food can be heated up by the thermal conductive through the pot body 10 and the thermal convection through the liquid in the fluid cavity 22. In other words, when the food contacts with the peripheral portion of the bottom wall 11 and/or the peripheral wall 12 of the pot body, the food will be cooked by the thermal conductive of the pot body 10. Furthermore, when the food contacts with the surrounding wall 21 of the fluid reservoir 20, the food will be cooked by the thermal conductive of the surrounding wall 21 which is heated by the thermal convection of the liquid in the fluid cavity 22. Therefore, the food in the cooking cavity 13 will not be directly cooked at the high temperature zone of the pot body 10.

Figure 3:
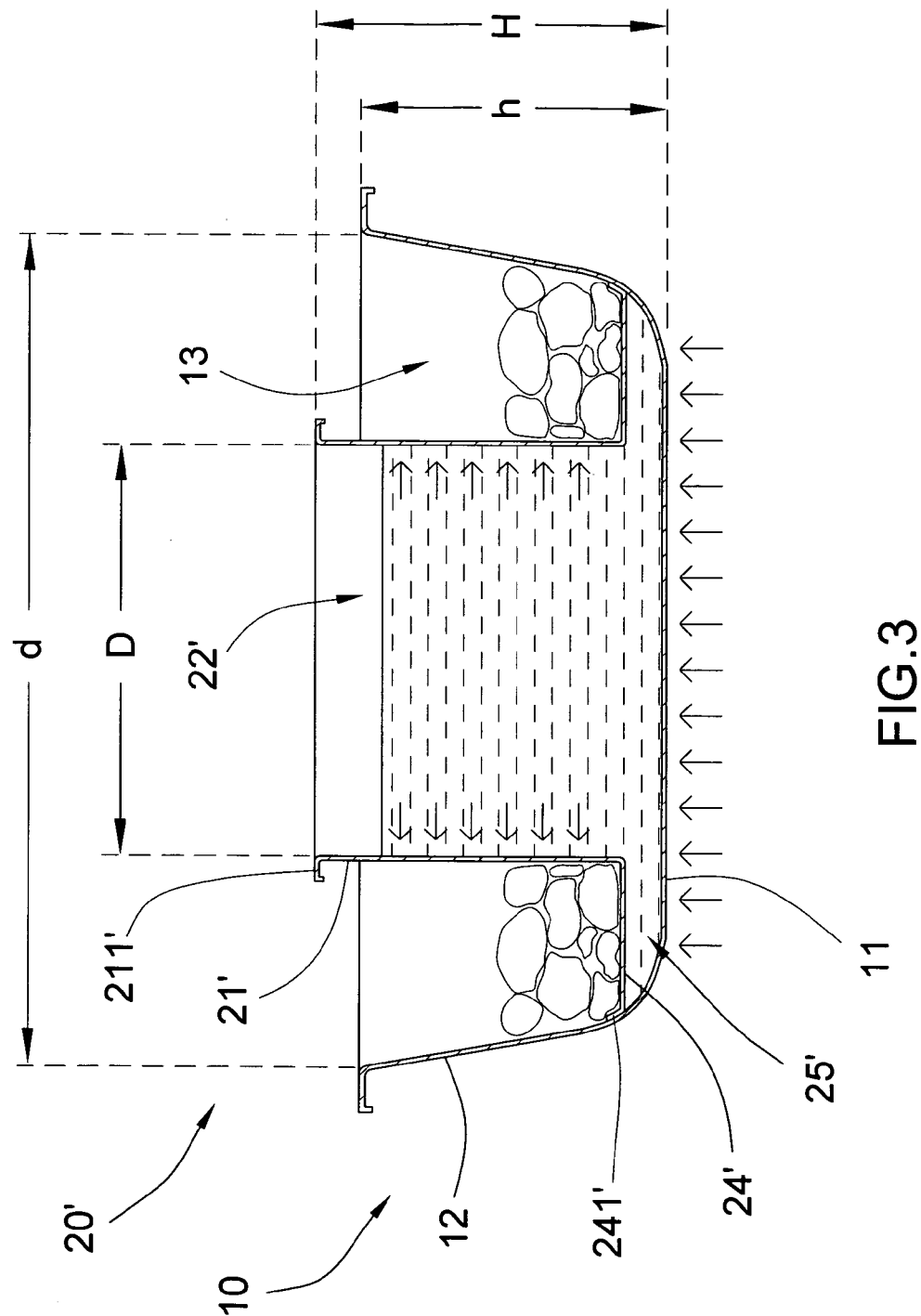
FIG. 3 is a sectional view of the cooking pot for dry-cooking according to a second embodiment of the present invention.

As shown in FIG. 3, a second embodiment of the cooking pot for dry-cooking illustrates a modification of the first embodiment of the present invention. The pot body 10 has the same structural configuration as the first embodiment, wherein the fluid reservoir 20' is modified.

According to the second embodiment, the fluid reservoir 20' is provided within the pot body 10 at the high temperature zone. Therefore, the pot body 10 and the fluid reservoir 20' are the outer and inner pot bodies to form a dual pot structure.

The fluid reservoir 20' comprises a surrounding wall 21' upwardly extended from the center portion of the pot body 10 wherein a fluid cavity 22' is formed within the surrounding wall 21' for receiving a predetermined amount of liquid therein. Accordingly, the cooking cavity 13 and the fluid cavity 22' are two individual cavities.

Likewise, the height H of the surrounding wall 21' of the fluid reservoir 20' is larger than the height h of the pot body 10. In other words, the depth of the fluid cavity 22' is larger than the depth of the cooking cavity. Therefore, when the fluid reservoir 20' is filled with water during the heating process, the water in the fluid cavity 22' will not spill out to the cooking cavity 13.

As shown in FIG. 3, the surrounding wall 21' has a top blocking rim 211' protruded integrally, outwardly and radially. Accordingly, the top opening of the fluid cavity 22' is defined with the top blocking rim 211'. In other words, the top blocking rim 211' is located above the top opening of the cooking cavity 13.

The fluid reservoir 20' further comprises a base wall 24' having an inner edge integrally extended from a bottom edge of the surrounding wall 21' and an outer edge coupled to the peripheral wall 12 of the pot body 10 to define a secondary fluid cavity 25' between the bottom wall 11 of the pot body 10 and the base wall 24' of the fluid reservoir 20' to communicate with the fluid cavity 22' within the surrounding wall 21'. In other word, the bottom edge of the surrounding wall 21' is located above the bottom wall 11 of the pot body 10. Preferably, the surrounding wall 21' has a cylindrical shape integrally extended from the base wall 24'. In other words, the fluid cavity 22' has a uniform diameter.

It is worth mentioning that the base wall 24' of the fluid reservoir 20' is integrally extended from the peripheral wall 12 which is at the predetermined distance from the bottom wall 11 of the pot body 10. The base wall 24' is extended in the position which is slightly above the bottom wall 11 of the pot body 10 such that the surrounding wall 21' of the fluid reservoir 20', the base wall 24' of the fluid reservoir 20', the bottom wall 11 of the pot body 10 is defined as a high temperature isolating fluid cavity which is formed by the fluid cavity 22' and the secondary fluid cavity 25'. In other words, the peripheral wall 12 of the pot body 10, the base wall 24' of the fluid reservoir 20', and the surrounding wall 21' of the fluid reservoir 20' are defined as the cooking cavity 13. It is worth mentioning that the surrounding wall 21' and the base wall 24' of the fluid reservoir 20' are heated up by the thermal convection through the liquid while the peripheral wall 12 of the pot body 10 is directly heated up by the thermal conduction through the pot body 10 itself.

According to the second preferred embodiment of the present invention, the cooking pot can be used for the heat source having a large area of heat-generating surface, wherein the heat source can generate the heat at the whole area of the bottom wall 11. In other words, the high temperature zone of the pot body can be the entire bottom wall 11. Moreover, the arc-shape peripheral wall 12 can increase the cooking surface for the food, wherein the arc-shape peripheral wall 12 can support the heat flow provided by the heat source such that the heat flow from the heat source can heat on the pot body 10 along the bottom wall 11 to the peripheral wall 12.

It is worth to mentioning that the base wall 24' of the fluid reservoir 20' sealedly welded on the peripheral wall 12 of the pot body 10 has a welding edge 241', wherein the welding edge 241' is outwardly and upwardly seadedly welded along the peripheral wall 12 such that the liquid in the fluid cavity 22' will not leak into the cooking cavity 13. Since the welding edge 241' of the base wall 24' is located at the low temperature zone of the pot body 10, the welding structure of the welding edge 241' will not be affected.

It is worth mentioning that the surrounding wall 21' can be formed in conical shape that the diameter of the fluid cavity 22' is gradually reduced from the top blocking rim 211' toward the bottom wall 11 of the pot body 10. Therefore, the top opening area of the cooking cavity 13 will be substantially enlarged.

It is worth mentioning that the pot body 10 and the fluid reservoir 20, 20' form the outer and inner pot bodies of the cooking pot with a dual pot structure, wherein the inner pot body is provided in the outer pot body at the high temperature zone. Therefore, the inner pot body is arranged to thermally transfer the heat from the high temperature zone to the cooking cavity 13 via the thermal convection of liquid. During dry cooking process, the low temperature zone directly transfers the heat to the cooking cavity via thermal conduction while the high temperature zone indirectly transfers the heat to the cooking cavity via the thermal convection of the liquid.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A cooking pot for preparing different foods by heat, comprising:
    a pot body comprising a thermal conduction bottom wall and a peripheral wall and defining a cooking cavity within said peripheral wall, wherein said pot body is arranged for supporting on a heat generating surface of a heat source to conduct heat at said thermal conduction bottom wall, wherein said peripheral wall of said pot body is an inclined wall upwardly and outwardly extended from said thermal conduction bottom wall of said pot body such that a diameter size of said cooking cavity is gradually increased from said thermal conduction bottom wall of said pot body to enlarge an opening area of said cooking cavity; and
    a fluid reservoir comprising a thermal convection surrounding wall and a welding wall, wherein said welding wall is integrally extended from a bottom edge of said surrounding wall and permanently coupled at said thermal conduction bottom wall of said pot body and said thermal convection surrounding wall is upwardly extended from said welding wall and positioned at a center portion of said thermal conduction bottom wall of said pot body to define a fluid cavity within said thermal convection surrounding wall for receiving a predetermined amount of liquid therein for preparing the food in said fluid cavity via the liquid, wherein said fluid cavity has a uniform diameter, wherein said cooking cavity and said fluid cavity are two individual cavities for receiving the foods in said cooking cavity and said fluid cavity, wherein said pot body defines a high temperature zone at said center portion of said thermal conduction bottom wall which is big enough for covering said heat generating surface of said heat source, and defines a low temperature zone at a peripheral portion of said thermal conduction bottom wall to extend from said center portion to said peripheral wall, wherein said peripheral wall of said pot body is directly heat-conducted from said low temperature zone for preventing the heat from the heat source directly applied to said cooking cavity while said thermal convection surrounding wall of said fluid reservoir is heat-conducted through said liquid for preparing the food within said cooking cavity, wherein said peripheral portion of said thermal conduction bottom wall, said peripheral wall, and said thermal convection surrounding wall forms a triple-heating wall structure for preparing the food within said cooking cavity.

2. The cooking pot, as recited in claim 1, wherein said welding wall and a bottom edge of said thermal convection surrounding wall are sealed at said thermal conduction bottom wall of said pot body to divide an interior of said pot body into said cooking cavity and said fluid cavity.

3. The cooking pot, as recited in claim 2, wherein said welding wall is inwardly extended form said bottom edge of said thermal convection surrounding wall within said fluid cavity and said thermal convection surrounding wall is coaxially coupled at said center portion of said thermal conduction bottom wall of said pot body that said fluid cavity is surrounded by said cooking cavity.

4. The cooking pot, as recited in claim 3, wherein said fluid cavity has a depth larger than a depth of said cooking cavity.

5. The cooking pot, as recited in claim 4, wherein a diamond of said fluid reservoir is at least half of a diamond said pot body.

6. The cooking pot, as recited in claim 5, wherein said thermal convection surrounding wall has a top blocking rim protruded outwardly, wherein said top blocking rim is located above a top opening of said cooking cavity.

7. The cooking pot, as recited in claim 5, wherein a height of said surrounding wall is larger than a height of said pot body.

8. The cooking pot, as recited in claim 2, wherein a diamond of said fluid reservoir is at least half of a diamond said pot body.

9. A cooking pot for preparing different foods by heat, comprising:

a pot body comprising a thermal conduction bottom wall and a peripheral wall and defining a cooking cavity within said peripheral wall, wherein said pot body is arranged for supporting on a heat generating surface of a heat source to conduct heat at said thermal conduction bottom wall, wherein said peripheral wall of said pot body is an inclined wall upwardly and outwardly extended from said thermal conduction bottom wall of said pot body such that a diameter size of said cooking cavity is gradually increased from said thermal conduction bottom wall of said pot body to enlarge an opening area of said cooking cavity; and a fluid reservoir comprising a thermal convection surrounding wall and a base wall, wherein said thermal convection surrounding wall is upwardly extended from said base wall at a center portion of said thermal conduction bottom wall of said pot body to define a fluid cavity within said thermal convection surrounding wall for receiving a predetermined amount of liquid therein for preparing the food in said fluid cavity via the liquid, said base wall having an inner edge extended from a bottom edge of said thermal convection surrounding wall and an outer edge coupled to said peripheral wall of said pot body to define a secondary fluid cavity between said thermal conduction bottom wall of said pot body and said base wall of said fluid reservoir to communicate with said fluid cavity within said thermal convection surrounding wall.

10. The cooking pot, as recited in claim 9, wherein said fluid cavity a depth larger than a depth of said cooking cavity.

11. The cooking pot, as recited in claim 10, wherein said thermal convection surrounding wall has a top blocking rim protruded outwardly, wherein said top blocking rim is located above a top opening of said cooking cavity.

12. The cooking pot, as recited in claim 11, wherein a height of said surrounding wall is larger than a height of said pot.

* * * * *